J. E. DAVIS.
Ox-Shoes.

No. 158,473. Patented Jan. 5, 1875.

WITNESSES
Robert Everett
F. J. Masi

INVENTOR
John E. Davis
Chipman Hosmer & Co.
ATTORNEYS.

UNITED STATES PATENT OFFICE.

JOHN E. DAVIS, OF BRADFORD, VERMONT, ASSIGNOR OF ONE-HALF HIS RIGHT TO GEORGE BALDWIN, OF SAME PLACE.

IMPROVEMENT IN OX-SHOES.

Specification forming part of Letters Patent No. 158,473, dated January 5, 1875; application filed November 21, 1874.

*To all whom it may concern:*

Be it known that I, JOHN E. DAVIS, of Bradford, in the county of Orange and State of Vermont, have invented a new and valuable Improvement in Ox-Shoes; and I do hereby declare that the following is a full, clear, and exact description of the construction and operation of the same, reference being had to the annexed drawings, making a part of this specification, and to the letters and figures of reference marked thereon.

Figure 1:
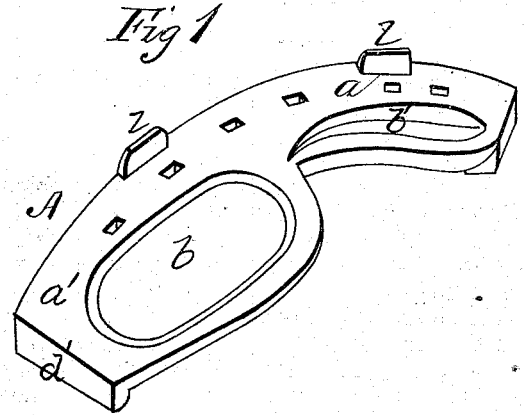
Figure 2:
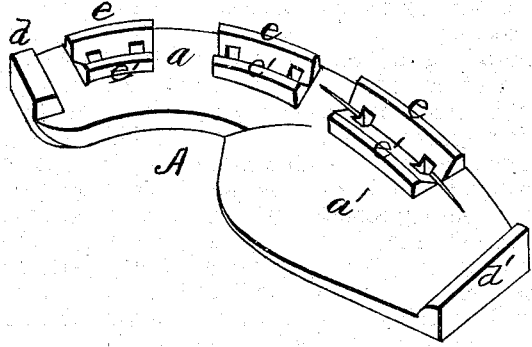
Figure 3:

Figure 1 of the drawing is a representation of a top perspective of one section of my ox-shoe. Fig. 2 is a bottom perspective of the same, and Fig. 3 is a sectional view.

This invention has relation to metallic shoes for oxen, which are made in two sections; and the nature of the invention consists in a recess of suitable size cut into the body of the shoe, near the front part of each section thereof, into which the soft part of the "pad" of the foot is received, thereby allowing it full room to expand when the hoof is put to the ground, and obviating all danger of rendering the animal lame. It also consists in a small recess cut into the inner rear edge of each section of the shoe, wherein the "bead" of the hoof is received when it is put to the ground, with a similar useful result. It furthermore consists in a double flange, arranged at the outer edges of each section, between which the holes for the nails are cut, in combination with a "calk" upon the front edge of each section, whereby a support is afforded, whereby the hoof is kept in a level position, and an undue separation of the two toes or sections thereof is prevented, and a frequent source of lameness effectually done away with, as will be hereinafter more fully explained.

In the annexed drawings, in which I have caused to be shown only such parts of a shoe as are necessary to illustrate my invention, A designates one of the sections of an ox-shoe, consisting of a curved metallic strip, $a$, terminating in an inwardly-projecting part, $a'$, having a preferably curved inner edge, as shown. The enlargement $a'$ of the said section is made with an oblong dish or recess, $b$, and a second recess, $b'$, is also cut into the inner edge of the curved metallic strip $a$, the former for the purpose of receiving the pad, and the latter the bead of each section of hoof.

In all shoes heretofore constructed it has been a source of complaint that when nailed to the hoof they frequently caused injury thereto, not unfrequently terminating in permanent and incurable lameness, because of the bruising and compression of both the pad and bead by the flat upper surfaces of the shoe-section.

This defect is effectually obviated by making the recesses $b$ $b'$ as above described, in which the pad and the bead are respectively received, having sufficient space therein to expand naturally, and throwing the weight of the body outward upon the strong, tough, horny part of the hoof, upon which it is received when the animal is unshod. The outer edges of this shoe have a number of perforations cut through them for the reception of the nails, and are provided with vertical lugs $l$, which help to keep the sections of shoe from being torn from the hoof. $d$ $d'$ indicate calks arranged, respectively, upon the front and rear lower edges of the shoe-sections, which are designed for giving them a reliable hold upon the ground when going up hill or during cold weather; and $e$ $e'$ are two parallel flanges, the former situated upon the lower lateral edge of the shoe-section, and the latter a suitable distance inside of the former, to leave a sufficient space between them for the reception of the nails, the perforations therefor being made between the said flanges, so that when the section is nailed upon the hoof the ends of the said nails shall be flush with the lower edges of the flanges, thus affording a support for the hoof, whereby its sections or toes are prevented from undue separation, thereby preventing straining of their ligaments, and removing a frequent source of incurable lameness.

What I claim as new, and desire to secure by Letters Patent, is—

1. The sectional ox-shoe, having the recess $b$ for the reception of the pad, and the recess $b'$ for the reception of the bead of an ox's hoof, substantially as specified.

2. In a sectional ox-shoe, the combination of the calks $d$ $d'$ and the flanges $e$ $e'$ upon the lower lateral edges thereof, substantially as and for the purpose set forth.

In testimony that I claim the above I have hereunto subscribed my name in the presence of two witnesses.

JOHN E. DAVIS.

Witnesses:
 JOHN B. CORLISS,
 GEORGE E. UPHAM.